United States Patent
Theis et al.

(10) Patent No.: US 7,343,179 B1
(45) Date of Patent: Mar. 11, 2008

(54) SYSTEM AND METHOD FOR PREVIEWING AND PURCHASING RING TONES FOR A MOBILE DEVICE

(75) Inventors: Ronald L. A. Theis, Palo Alto, CA (US); Phillip A. Myles, Hayward, CA (US)

(73) Assignee: Danger Research, Palo Alto, CA (US)

( * ) Notice: Subject to any disclaimer, the term of this patent is extended or adjusted under 35 U.S.C. 154(b) by 121 days.

(21) Appl. No.: 10/640,896

(22) Filed: Aug. 13, 2003

(51) Int. Cl.
*H04B 1/38* (2006.01)
*H04M 1/00* (2006.01)
*G06F 15/16* (2006.01)
*G06Q 30/00* (2006.01)
*G06Q 40/00* (2006.01)

(52) U.S. Cl. ............... 455/567; 455/412.2; 709/246; 709/203; 705/26; 705/40

(58) Field of Classification Search ............ 455/567, 455/414.1, 412.2; 705/26, 40, 51; 704/275; 709/246, 203
See application file for complete search history.

(56) References Cited

U.S. PATENT DOCUMENTS

| | | |
|---|---|---|
| 5,159,592 A | 10/1992 | Perkins |
| 5,559,800 A | 9/1996 | Mousseau et al. |
| 5,594,910 A | 1/1997 | Filepp et al. |
| 5,715,387 A | 2/1998 | Barnstijin et al. |
| 5,727,159 A | 3/1998 | Kikinis |
| 5,727,202 A | 3/1998 | Kucala |
| 5,778,176 A | 7/1998 | Geihs et al. |
| 5,790,974 A | 8/1998 | Tognazzini |
| 5,802,312 A | 9/1998 | Lazaridis et al. |

(Continued)

FOREIGN PATENT DOCUMENTS

WO    98/36344 A2    8/1998

(Continued)

OTHER PUBLICATIONS http:www.visualgsm.com/online_demo5.htm; Request Polyphonic Ring Tone delivered by WAP Push via SMS. Copyright 2002 VISUALtron Software Corporation.*

(Continued)

*Primary Examiner*—George Eng
*Assistant Examiner*—Wesley Kim
(74) *Attorney, Agent, or Firm*—Blakely, Sokoloff, Taylor & Zafman, LLP

(57) ABSTRACT

Described herein is a ring tone delivery system and method for previewing and/or buying a ring tone from a wireless service directly through a wireless data processing device. The method comprises: allowing a user to play a ring tone preview; receiving a purchase request from the device; and causing the ring tone associated with the preview to be stored on the device. The system comprises: a ring tone preview module for transmitting a ring tone preview directly from a wireless service to a device; a ring tone catalog application for allowing a user to play back the ring tone preview on the device; and a ring tone purchase/download module to receive a ring tone purchase request directly from the device; wherein the ring tone purchase/download module and/or the ring tone catalog application causes a ring tone associated with the preview to be stored on the device.

15 Claims, 3 Drawing Sheets

U.S. PATENT DOCUMENTS

| | | | |
|---|---|---|---|
| 5,915,095 | A | 6/1999 | Miskowiec |
| 5,961,590 | A | 10/1999 | Mendez et al. |
| 5,964,830 | A | 10/1999 | Durrett |
| 6,023,708 | A | 2/2000 | Mendez et al. |
| 6,035,339 | A | 3/2000 | Agraharam et al. |
| 6,076,109 | A | 6/2000 | Kikinis |
| 6,151,677 | A | 11/2000 | Walter et al. |
| 6,157,935 | A | 12/2000 | Tran et al. |
| 6,166,734 | A | 12/2000 | Nahi et al. |
| 6,167,441 | A | 12/2000 | Himmel |
| 6,199,099 | B1 | 3/2001 | Gershman et al. |
| 6,286,063 | B1 | 9/2001 | Bolleman et al. |
| 6,330,618 | B1 | 12/2001 | Hawkins et al. |
| 6,336,137 | B1 | 1/2002 | Lee et al. |
| 6,370,687 | B1 | 4/2002 | Shimura |
| 6,396,482 | B1 | 5/2002 | Griffin et al. |
| 6,418,310 | B1 | 7/2002 | Dent |
| 6,438,601 | B1 | 8/2002 | Hardy |
| 6,622,175 | B1 | 9/2003 | Piller |
| 2002/0007545 | A1 | 1/2002 | Tarpenning et al. |
| 2002/0010757 | A1 | 1/2002 | Granik et al. |
| 2002/0137530 | A1* | 9/2002 | Karve .................. 455/466 |
| 2003/0167230 | A1* | 9/2003 | McCarthy ................ 705/40 |
| 2003/0181242 | A1* | 9/2003 | Lee et al. .................. 463/42 |

FOREIGN PATENT DOCUMENTS

| | | |
|---|---|---|
| WO | WO 98/36344 A2 | 8/1998 |

OTHER PUBLICATIONS

Meggers, J., et al., "A multimedia communication architecture for handheld devices," Personal Indoor And Mobile Radio Communications, 1998, Sep. 8-11, 1998, IEEE, pp. 3 double-sided.

Bergzen H, "Project Status And System Architecture Of An Automated HF System To Be Used By The Swedish Armed Forces," Oct. 28, 2001 IEEE Military Communications Conference, pp. 4 double sided.

Henderson, R. C., et al., "A Taxonomy of Network Transcoding" Proceedings of the SPIE, vol. 3969, Jan. 24, 2000, pp. 65-72, XP008007261, ISSN: 0277-786X.

Fox, A., et al., "Adapting To Network And Client Variability Via On-Demand Dynamic Distillation" ACM Sigplan Notices, Association for Computing Machinery, vol. 31, No. 9, Sep. 1, 1996, pp. 160-170, XP000639230, ISSN: 0362-1340.

Mohan, R., et al., "Content Adaptation Framework: Bringing the Internet To Information Appliances" 1999 IEEE Global Telecommunications Conference Globecom 1999, Seamless Interconnection For Universal Services, vol. 4, Dec. 5, 1999, pp. 2015-2021, XP000951336, ISBN: 0-7803-5797-3.

"CC/PP Attribute Vocabularies" W3C Jul. 21, 2000, XP002218349.

Abrams, M., et al., "UIML: An Appliance-Independent XML User Interface Language" Proceedings of the International Conference On World Wide Web, May 11, 1999, pp. 1-14, XP002163485.

Excite Home Page, http://www.excite.com/, 1 page Aug. 1, 2000.

Alta Vista Home Page, http://www.altavista.com/, 1 Page Aug. 1, 2000.

Yahoo Home Page, http://www.yahoo.com/, 1 page Aug. 1, 2000

Anita Komlodi, Key Frame Preview Techniques For Video Browsing, Digital Library Research Group, College of Library and Information Services University of Maryland, pp. 118-125.

Appenzeller, et al.., "User-friendly Access Control For Public Network Ports", IEEE, pp. 699-707, Mar. 1999.

* cited by examiner

SYSTEM AND METHOD FOR PREVIEWING AND PURCHASING RING TONES FOR A MOBILE DEVICE

BACKGROUND

1. Field of the Invention

This invention relates generally to the field of data processing systems. More particularly, the invention relates to a system and method for sampling and purchasing ring tones on a mobile device.

2. Description of the Related Art

Many current mobile phones provide for the installation of new ring tones. Typically, users must upgrade ring tones by logging in to the Website of the mobile telephone manufacturer and/or service provider and downloading the new ring tones to a personal computer. The ring tones may then be transferred to the mobile telephone via the personal computer. Alternatively, once a ring tone is purchased at the Website, the new ring tone is transmitted to the mobile telephone over the service provider's network (e.g., using the short message service ("SMS") protocol).

Prior to downloading a ring tone from a Website, the ring tone may be previewed on the personal computer from which the Website is accessed. For example, if the ring tone is in the form of a MIDI file or WAV file, the MIDI file or WAV file (or a portion thereof) may be downloaded and previewed on the user's personal computer.

Several limitations exist with current systems for upgrading ring tones. First, current systems do not allow a user to purchase and download new ring tones directly over the wireless service provider network. Rather, as described above, users must log in to the service provider and/or mobile telephone manufacturer Website from a personal computer. Second, current systems only allow users to preview ring tones on a personal computer. As a result, because the audio subsystems used on personal computers are typically different from the audio subsystems used on mobile devices, the preview of a ring tone may sound noticeably different from the way the ring tone actually sounds when played back on the mobile device.

These and other problems associated with prior ring tone systems are solved by the embodiments of the invention described below.

SUMMARY

A method is described comprising: transmitting a ring tone preview directly from a wireless service to a wireless data processing device in response to a ring tone preview request; allowing a user to play back the ring tone preview on the wireless data processing device a specified number of times prior to purchasing the ring tone; receiving a ring tone purchase request at the wireless service transmitted directly from the wireless data processing device; and causing an actual ring tone associated with the ring tone preview to be stored within a ring tone gallery on the data processing device, the ring tones within the ring tone gallery accessible by applications executed on the data processing device.

Also described is a ring tone preview system comprising: a ring tone preview module for transmitting a ring tone preview directly from a wireless service to a wireless data processing device in response to a ring tone preview request; a ring tone catalog application for allowing a user to play back the ring tone preview on the wireless data processing device a specified number of times prior to purchasing the ring tone; and a ring tone purchase/download module to receive a ring tone purchase request at the wireless service transmitted directly from the wireless data processing device; wherein the ring tone purchase/download module and/or the ring tone catalog application causes an actual ring tone associated with the ring tone preview to be stored within a ring tone gallery on the data processing device, the ring tones within the ring tone gallery accessible by applications executed on the data processing device.

BRIEF DESCRIPTION OF THE DRAWINGS

A better understanding of the present invention can be obtained from the following detailed description in conjunction with the following drawings, in which.

DETAILED DESCRIPTION OF PREFERRED EMBODIMENTS

Described below is a system and method for multi-mode user interface for contacting a user. Throughout the description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Embodiments of a Data Processing Service

Figure 1:
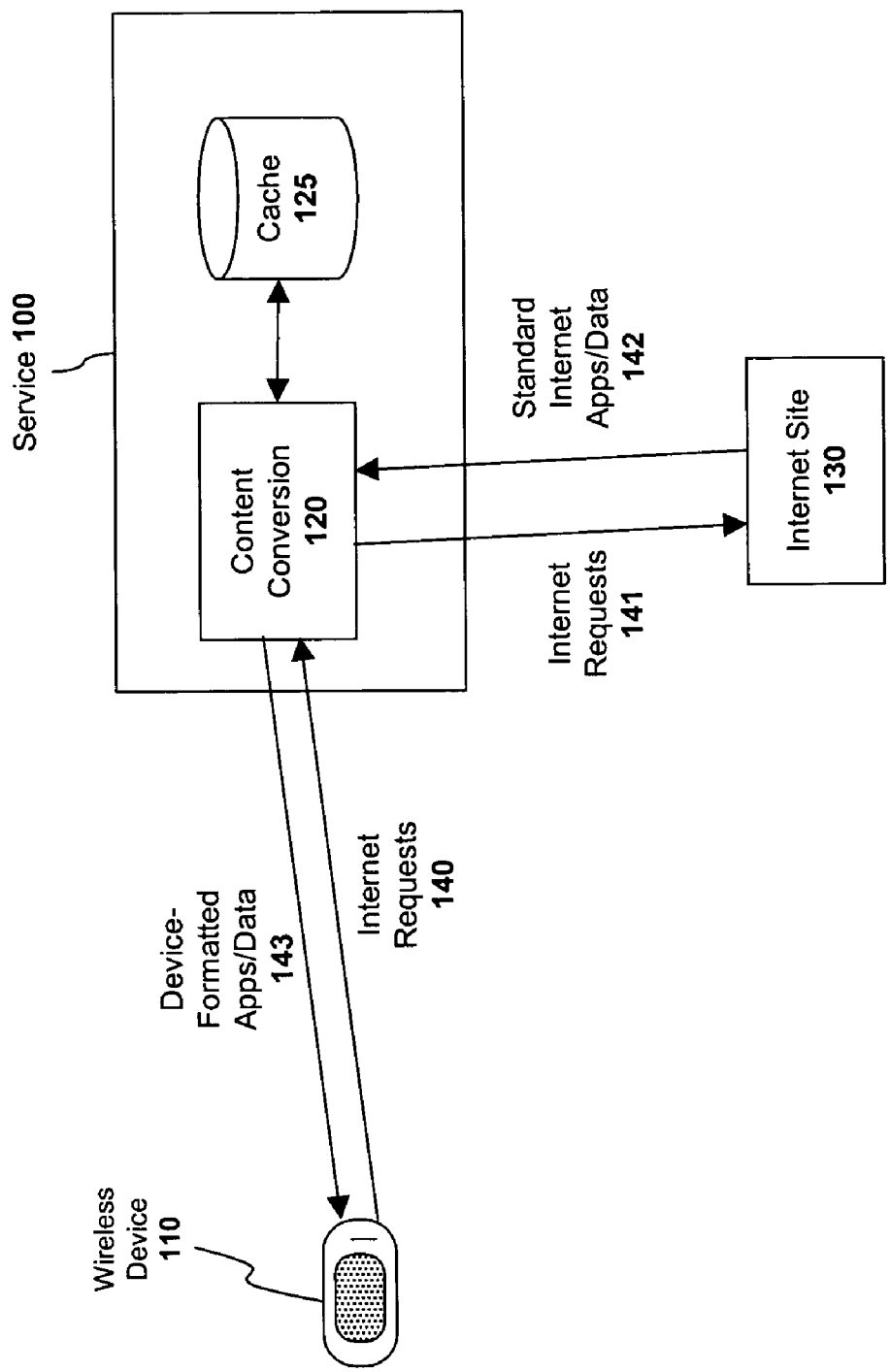
FIG. 1 illustrates a service communicating with a data processing device according to one embodiment of the invention.

Embodiments of the invention may be implemented on a wireless device 110 which communicates with a data processing service 100 as illustrated generally in FIG. 1. Embodiments of a service 100 and data processing device 110 are described in co-pending application entitled NETWORK PORTAL SYSTEM, APPARATUS AND METHOD, Ser. No. 09/714,897, filed Nov. 15, 2000, which is assigned to the assignee of the present application and which is incorporated herein by reference. Certain features of the service 100 will now be described followed by a detailed description of a system and method for sampling and purchasing ring tones for a data processing device.

In one embodiment, the service 100 converts standard applications and data into a format which each wireless data processing device 110 can properly interpret. Thus, as illustrated in FIG. 1, one embodiment of the service 100 includes content conversion logic 120 for processing requests for Internet content 140. More particularly, the service 100 acts as a proxy for the data processing device 110, forwarding Internet requests 140, 141 to the appropriate Internet site 130 on behalf of the data processing device 110, receiving responses 142 from the Internet site 130 in a standard Internet format (e.g., Web pages with embedded audio/video and graphical content, e-mail messages with attachments, . . . etc), and converting the standard Internet responses 142 into a format which the data processing device 110 can process (e.g., bytecodes as described in the co-pending applications).

For example, the conversion logic 120 may include a hypertext markup language ("HTML") rendering module (not shown) for interpreting HTML code and downloading any embedded content in the HTML code (e.g., graphics, video, sound, . . . etc) to the service 100. The conversion logic 120 may then combine the HTML code and embedded content and generate a set of bytecodes for accurately reproducing the requested content on the data processing device 110. As described above, in one embodiment, the bytecodes may be Java bytecodes/applets. However, the conversion logic 120 may generate various other types of interpreted and/or non-interpreted code, depending on the particular type of data processing device 110 being used (e.g., one with an interpreter module or one without).

Because one embodiment of the service 100 maintains an intimate knowledge of the capabilities/configuration of each data processing device 110 (e.g., screen size, graphics/audio capabilities, available memory, processing power, user preferences, . . . etc) it can reconstruct the requested Internet content accurately, while at the same time minimizing the bandwidth required to transmit the content to the device 110. For example, the conversion logic 120 may perform pre-scaling and color depth adjustments to the requested content so that it will be rendered properly within the data processing device's 110's display. In making these calculations, the conversion may factor in the memory and processing power available on the data processing device 110. In addition, the conversion logic 120 may compress the requested content using a variety of compression techniques, and thereby preserve network bandwidth.

System and Method for Previewing and Purchasing Ring Tones for a Mobile Device

Unlike prior systems which required users to preview and install new ring tones via a personal computer, one embodiment of the invention allows users to preview and install new ring tones directly from a mobile device. This type of direct interaction is possible due in part to the close relationship between the mobile data processing device 110 and the service 100, as described above with respect to FIG. 1.

Figure 2:
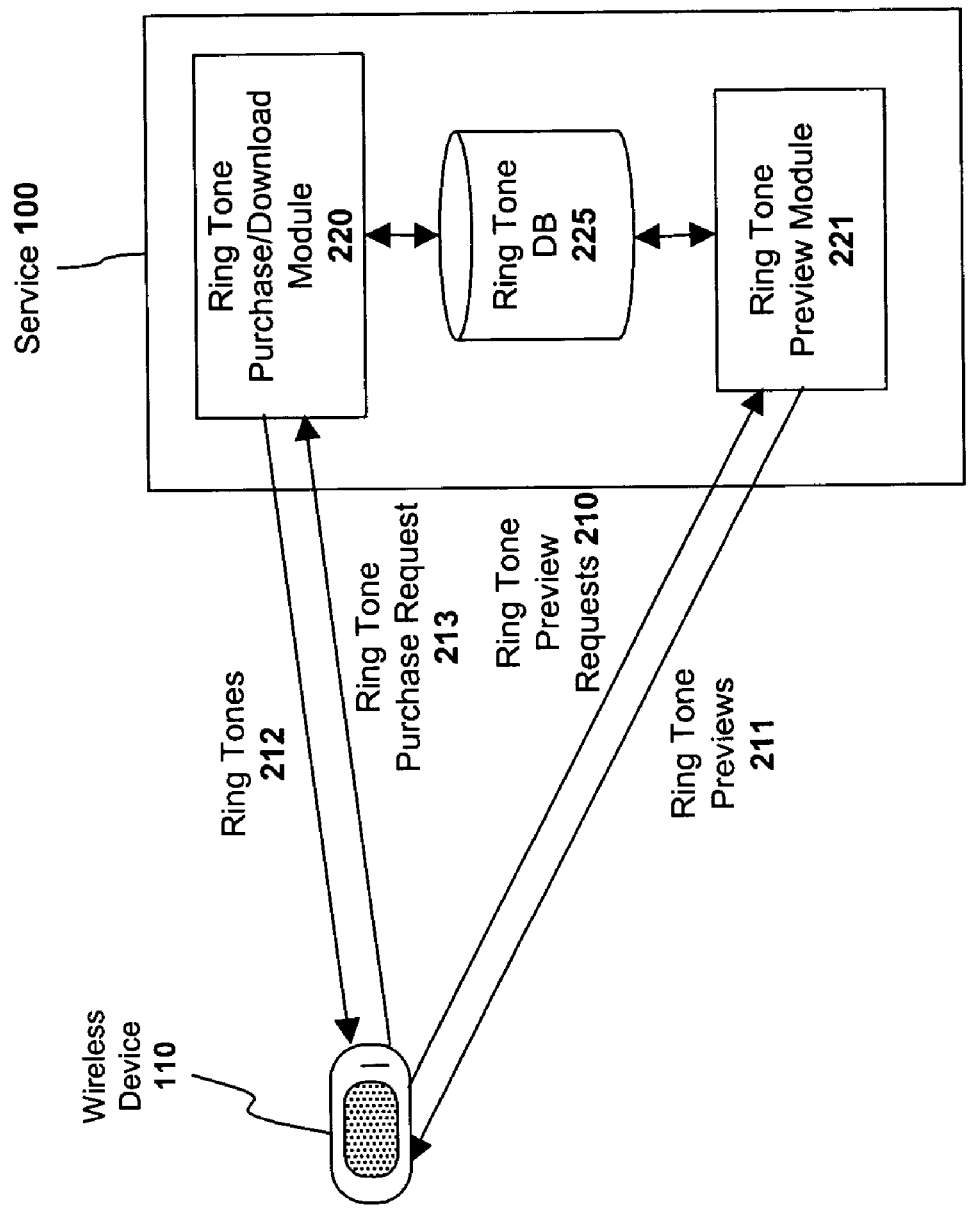
FIG. 2 illustrates one embodiment of the invention in which ring tone purchases and ring tone previews are provided directly from a service to a mobile device.

FIG. 2 illustrates one particular embodiment of a service 100 for providing ring tones previews 211 and new ring tones 212 directly to end users' mobile data processing devices 110. The service 100 includes a ring tone preview module 221 for retrieving ring tone previews 211 from a ring tone database 225 and providing the ring tone previews 211 to the mobile data processing device 110 in response to ring tone preview requests 210. The exemplary service 100 also includes a ring tone download module 220 for retrieving purchased ring tones 212 from the ring tone database 225 and providing the purchased ring tones 212 to the mobile data processing device 110 in response to ring tone purchase requests 213. Although illustrated in FIG. 2 as separate modules, it will be appreciated that the ring tone preview module 221 and ring tone purchase/download module 220 may actually be implemented within the same functional module.

Figure 3:
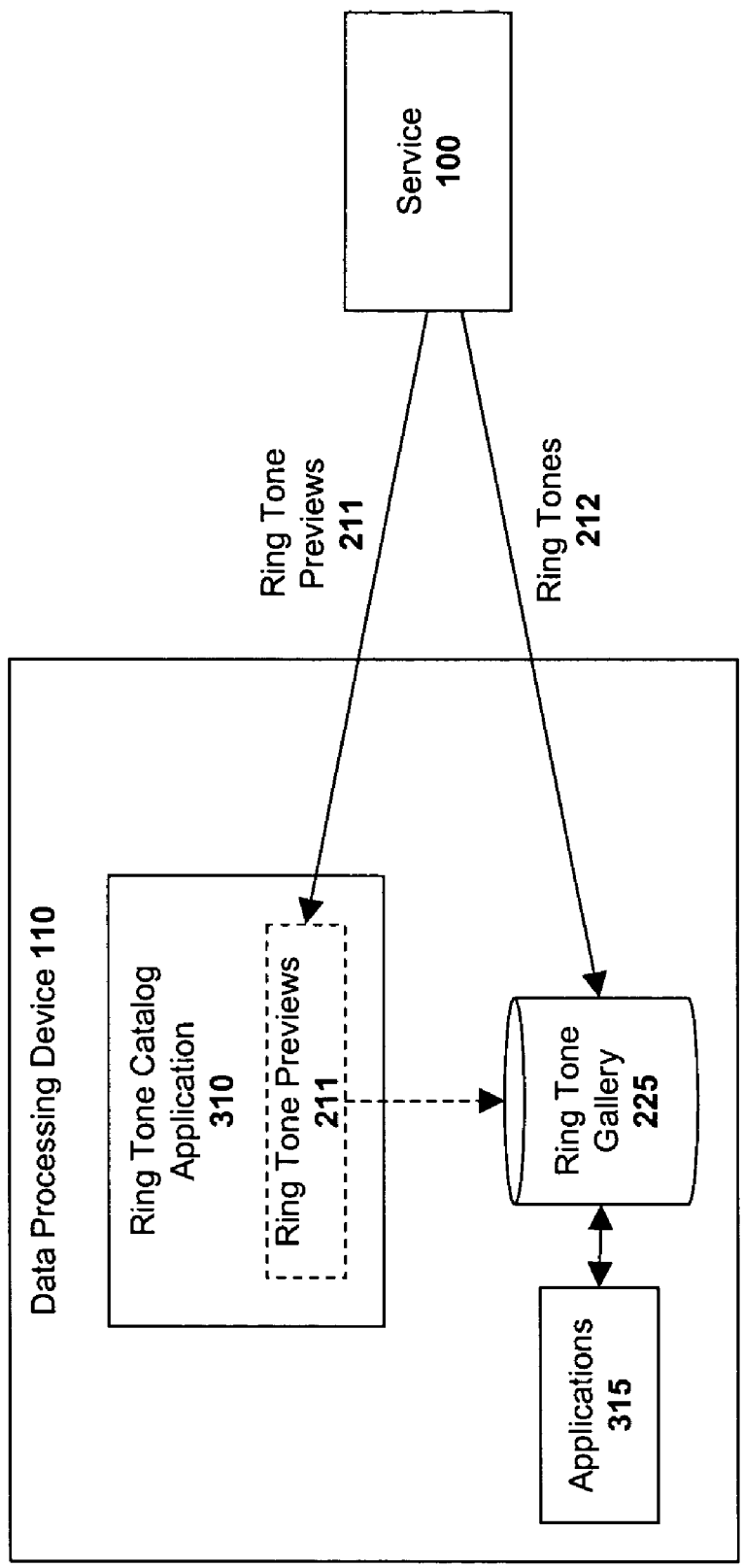
FIG. 3 illustrates a ring tone catalog application according to one embodiment of the invention.

In one embodiment, the ring tone previews 211 provided by the ring tone preview module 221 are truncated versions of the actual ring tones 212. Alternatively, in one embodiment, the ring tone previews 211 are the same as the actual ring tones 212 but are processed and stored differently than the actual ring tones 212 on the mobile data processing device 110. For example, as illustrated in FIG. 3, in one embodiment, ring tone previews 211 are processed and stored within a ring tone catalog application 310. Once a ring tone preview 211 is downloaded to the ring tone catalog application 310, an end user may play back the ring tone preview 211 a specified number of times (e.g., 5 times) before making a decision on whether to purchase the actual ring tone 212. Alternatively, in one embodiment, the ring tone catalog application 310 will allow the end user to play back the ring tone preview 211 an unlimited number of times, but only from within the ring tone catalog application 310. For example, other applications 315 such as telephony applications or email applications will not be permitted to access the ring tone preview 211.

As mentioned above, because the ring tone preview 211 is played back on the mobile device as opposed to a personal computer, the playback of the ring tone preview 211 sounds exactly as it will if the user decides to purchase the ring tone. For example, if the ring tone is a musical instrument digital interface ("MIDI") ring tone, the same MIDI wave tables will be used to generate the ring tone. By contrast, the user's personal computer may be configured with a different set of wave tables (or, at least, a different speaker system).

In one embodiment, after the ring tone preview 211 has been played back a designated number of times, the ring tone catalog application 310 locks the ring tone preview 211 or, alternatively, deletes the ring tone preview 211 from the data processing device 110, thereby making the ring tone preview 211 inaccessible to the end user. When the user purchases the ring tone, a ring tone purchase request 213 is transmitted to the service 100, which registers the purchase (i.e., for billing purposes) and transmits the actual ring tone 212 to the mobile data processing device 110. The mobile data processing device 110 then stores the new ring tone 212 within a ring tone gallery 225 which it is accessible by all applications 315 executed on the mobile data processing device 110 (e.g., voice telephony applications to indicate incoming calls, email applications to indicate new email messages, instant messaging applications to indicate new instant messages, . . . etc).

Alternatively, if the ring tone preview 211 is the same as the actual ring tone 212, as described above, then the ring tone catalog application 310 may simply transfer the ring tone preview 211 directly to the ring tone gallery 225 (as indicated by the dotted arrow in FIG. 3). In one embodiment, the ring tone application 310 transfers the ring tone preview 211 to the ring tone gallery 225 in response to a command provided by the ring tone purchase/download module 220).

In one embodiment, the ring tone preview 211 is actually stored within the ring tone gallery 225 from the start (e.g., in response to the ring tone preview request 210), but is designated as a "preview" as opposed to an actual ring tone. As such, due to its designation as a "preview," the ring tone preview 211 may only be accessed by specified applications (e.g., such as the ring tone catalog applications 310) and/or may be played back by any application, but only a specified number of times.

Embodiments of the invention may include various steps as set forth above. The steps may be embodied in machine-executable instructions which cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, although the invention was described in the context of specific types of applications (e.g., telephony applications, email, instant messaging, . . . etc), the underlying principles of the invention are not limited to any particular type of application. In addition, while the embodiments described above discuss particular formats for ring tones (e.g., MIDI, WAV), the underlying principles of the invention are not limited to any particular ring tone audio format. For example, in one embodiment, the ring tones are audio files compressed according to the MP3 compression format.

Moreover, the "ring tones" described herein may be used in a variety of different circumstances other than to notify the user of an incoming telephone call. For example, the ring tones may be played back under any set of circumstances while still complying with the underlying principles of the invention (e.g., in response to a manual "playback" request entered by the user).

Accordingly, the scope and spirit of the invention should be judged in terms of the claims which follow.

What is claimed is:

1. A method comprising:
   requesting a ring tone preview from an internet site by a wireless service in response to a ring tone preview request by a wireless data processing device;
   receiving at the wireless service the ring tone preview from the internet site;
   transmitting the ring tone preview directly from the wireless service to the wireless data processing device in response to the ring tone preview request;
   storing the ring tone preview in a ring tone gallery on the wireless data processing device, the ring tone gallery accessible by other applications executed on the data processing device;
   allowing a user of the wireless data processing device to play back the ring tone preview stored on the wireless data processing device with any application a specified number of times prior to purchasing the ring tone, the wireless data processing device automatically locking the ring tone preview from being played or automatically deleting the ring tone preview upon the ring tone preview having been played back the specified number of times by a combination of applications;
   receiving a ring tone purchase request at the wireless service transmitted directly from the wireless data processing device;
   upon receiving the ring tone purchase request, causing an actual ring tone associated with the ring tone preview to be stored within a ring tone gallery on the data processing device, the ring tones within the ring tone gallery accessible by applications executed on the data processing device;
   wherein the method also includes:
   forwarding request for data to a second internet site on behalf of a portal device;
   receiving said data from said second internet site on behalf of said portal device;
   converting said requested data to bytecodes which an interpreter module on said portal device can convert into native program code which a processor on said portal device can process;
   discarding portions of said requested data which said portal device is incapable of processing; and,
   transmitting said bytecodes to said portal device, wherein, said interpreter module comprises a modular networking interface for communicating over a wireless network according to a specified network protocol, and wherein,
   converting said requested data further comprises: determining said portal device's graphical capabilities; said converting said requested data to a particular bytecode format based on said graphical capabilities, said interpreter module converting said particular bytecode format into a video format directly processable by said processor.

2. The method as in claim 1 wherein, prior to the purchase of the ring tone, the ring tone preview may be played back only from within a ring tone catalog application executed on the data processing device.

3. The method as in claim 1 wherein the specified number of times is a unlimited number of times.

4. The method as in claim 1 wherein the ring tone preview is acoustically equivalent to the actual ring tone.

5. The method as in claim 4 wherein the ring tone preview is processed and maintained by a specified application executed on the wireless data processing device, and wherein, in response to the purchase request, the specified ring tone application causes the ring tone preview to be stored within a ring tone gallery, the ring tone gallery accessible by other applications executed on the data processing device.

6. The method as in claim 4 wherein the ring tone preview is initially stored within a ring tone gallery on the wireless data processing device, and wherein, prior to the purchase request, the ring tone preview is only accessible by a specified one or more applications and wherein, in response to the ring tone purchase request, the ring tone is made accessible to other applications executed on the wireless data processing device.

7. The method as in claim 4 wherein the ring tone preview is initially stored within a ring tone gallery on the wireless data processing device, and wherein, prior to the purchase request, the ring tone preview may only be played back a specified number of time and wherein, in response to the ring tone purchase request, the ring tone may be played back an unlimited number of times.

8. The method as in claim 1 wherein causing an actual ring tone associated with the ring tone preview to be stored within a ring tone gallery on the data processing device comprises transmitting the actual ring tone from the service to the data processing device.

9. A ring tone preview and portal system comprising:
   a ring tone preview module for transmitting a ring tone preview directly from a wireless service to a wireless data processing device in response to a ring tone preview request, wherein the wireless service requests the ring tone preview from an internet site in response to receiving the ring tone preview request from the wireless data processing device and further wherein the wireless service receives the ring tone preview from the internet site;

a ring tone catalog application for allowing a user of the wireless data processing device to play back the ring tone preview on any device application on the wireless data processing device a specified number of times prior to purchasing the ring tone, wherein the ring tone preview is stored within the ring tone catalog application, and further wherein the wireless data processing device automatically locks the ring tone preview from being played or automatically deletes the ring tone preview upon the ring tone preview having been played back the specified number of times by a combination of applications;

a ring tone purchase/download module to receive a ring tone purchase request at the wireless service transmitted directly from the wireless data processing device;

wherein the ring tone purchase/download module and/or the ring tone catalog application causes an actual ring tone associated with the ring tone preview to be stored within a ring tone gallery on the data processing device upon the data processing device receiving the actual ring tone in response to the ring tone purchase request, the ring tones within the ring tone gallery accessible by applications executed on the data processing device;

a portal device comprising a processor for processing native program code and an interpreter module for interpreting bytecodes and converting the bytecodes into the native program code for processing by the processor;

a portal server to forward a request for data to a second internet site on behalf of a said portal device and receive said data from said second internet site on behalf of said portal device; the portal server comprising a content conversion module to convert said requested data to bytecodes which said interpreter module on said portal device can convert into native program code and discard portions of said requested data which said portal device is incapable of processing;

the portal server to transmit said bytecodes to said portal device, wherein said interpreter module comprises a modular networking interface for communication over a wireless network according to a specified network protocol, and wherein, converting said requested data further comprises: determining said portal device's graphical capabilities, and converting said requested data to a particular bytecode format based on said graphical capabilities, said interpreter module converting said particular bytecode format into video format directly processable by said processor.

10. The system as in claim 9 wherein the specified number of times is a unlimited number of times.

11. The system as in claim 9 wherein the ring tone preview is acoustically equivalent to the actual ring tone.

12. The system as in claim 11 wherein in response to the purchase request, the ring tone catalog application causes the ring tone preview to be stored within a ring tone gallery, the ring tone gallery accessible by other applications executed on the data processing device.

13. The system as in claim 11 wherein the ring tone preview is initially stored within a ring tone gallery on the wireless data processing device, and wherein, prior to the purchase request, the ring tone preview is only accessible by the ring tone catalog application and wherein, in response to the ring tone purchase request, the ring tone is made accessible to other applications executed on the wireless data processing device.

14. The system as in claim 11 wherein the ring tone preview is initially stored within a ring tone gallery on the wireless data processing device, and wherein, in response to the ring tone purchase request, the ring tone may be played back an unlimited number of times.

15. The system as in claim 9 wherein causing an actual ring tone associated with the ring tone preview to be stored within a ring tone gallery on the data processing device comprises transmitting the actual ring tone from the service to the data processing device.

* * * * *